United States Patent [19]

Darnell et al.

[11] Patent Number: 4,895,923
[45] Date of Patent: Jan. 23, 1990

[54] POLYCARBONATE OF CYCLOHEXYLHYDROQUINONE

[75] Inventors: W. Ronald Darnell, Weber City, Va.; Winston J. Jackson, Jr., Kingsport, Tenn.

[73] Assignee: Eastman Kodak Company, Rochester, N.Y.

[21] Appl. No.: 200,168

[22] Filed: May 31, 1988

[51] Int. Cl.$^4$ .............................................. C08G 63/62
[52] U.S. Cl. ..................................... 528/196; 528/204
[58] Field of Search ................................. 528/196, 204

[56] References Cited

U.S. PATENT DOCUMENTS 3,326,854  6/1967  Jackson et al. ..................... 528/196
3,530,094  9/1970  Schnell et al. ....................... 528/196

Primary Examiner—Harold D. Anderson
Attorney, Agent, or Firm—John F. Stevens; William Heath, Jr.

[57] ABSTRACT

Disclosed are polycarbonates of cyclohexylhydroquinone having the recurring units:

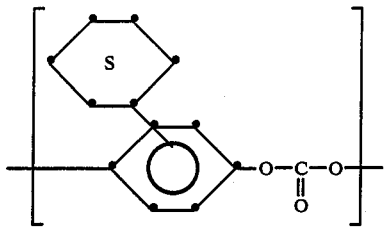

and copolycarbonates of cyclohexylhydroquinone having the recurring units:

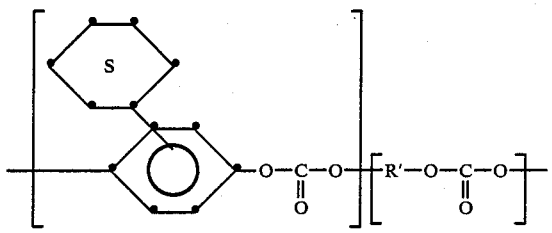

The polycarbonates and copolycarbonates of cyclohexylhydroquinone are characterized by their excellent solubility at high solids levels and absence of crystallization problems when used in solutions at high concentrations.

2 Claims, No Drawings

POLYCARBONATE OF CYCLOHEXYLHYDROQUINONE

TECHNICAL FIELD

The invention relates to novel compositions comprising polycarbonates and copolycarbonates of cyclohexylhydroquinone.

BACKGROUND OF THE INVENTION

Polycarbonate and copolycarbonate compositions are known to be useful as molding plastics and can also be extruded or cast into films. They are universally extolled for their ability to provide clear, tough plastic products. However, present commercially available polycarbonate or copolycarbonate compositions such as bisphenol A polycarbonate suffer from poor solubility at relatively high solids levels (e.g., 40 w/w %) and tend to crystallize out of solution at these high concentrations.

Accordingly, it is an object of the present invention to provide polycarbonate and copolycarbonate compositions which possess excellent solubility at high solids levels.

Another object of the invention is to provide polycarbonates and copolycarbonates which do not exhibit the crystallization problems that characterize prior art polycarbonate and copolycarbonate solutions in conventional solvents such as dichloromethane at high solids levels and which still retain the desired clarity and toughness properties. By the term tough, we mean a film can be creased into substantially a 180° fold without breaking.

SUMMARY OF THE INVENTION

These and other objects of the invention are obtained by a polycarbonate of cyclohexylhydroquinone comprising the recurring units:

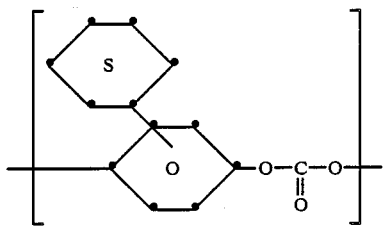

(I)

and having an inherent viscosity of at least about 0.3, preferably at least about 0.4, as measured at 25° C. and 0.1 g/100 mL in a 40/25/35 w/w/w mixture of o-chlorophenol/phenol/sym-tetrachloroethane.

The polycarbonates of the invention can be homopolymers as defined above or copolycarbonates comprising the recurring units:

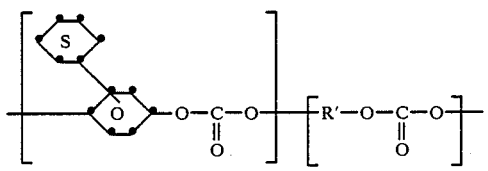

(II)

having inherent viscosities as above measured and specified; the (co)polycarbonates are comprised of at least about 50% to 100% of (I); and R' is a divalent aliphatic or divalent aromatic hydrocarbon.

When R' is a divalent aliphatic hydrocarbon, it is preferred that the hydrocarbon have from about 2 to 12 carbon atoms. An example of such an aliphatic hydrocarbon would be one wherein R' is a cyclohexyl radical having the structure:

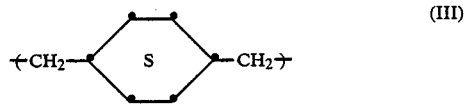

(III)

When R' of formula II above is a divalent aromatic hydrocarbon, it is preferred that the hydrocarbon unit contain from about 6–20 carbon atoms. Suitable aromatic hydrocarbons would include those wherein R' is a diphenyl radical having structures such as:

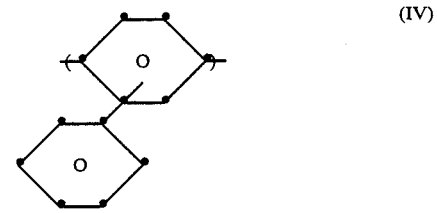

(IV)

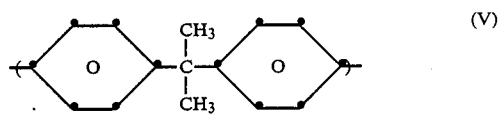

(V)

The novel polycarbonates and copolycarbonates of the present invention have inherent viscosities (I.V.'s) of at least about 0.3 and preferably at least about 0.4, and because of their excellent solubility at relatively high solids levels (at least about 40 w/w %), they are very useful as cast films. The novel polymers of the invention are also useful as molding plastics and extruded films.

DETAILED DESCRIPTION OF THE PREFERRED EMBODIMENTS

The polycarbonates and polycarbonate copolymers of the present invention can be prepared by conventional methods well known to those skilled in the art. Examples of some of these procedures are melt polymerization of the cyclohexylhydroquinone with diphenyl carbonate, solution polymerization with phosgene, and interfacial polymerization with phosgene. Cyclohexylhydroquinone is a compound known in the art and is disclosed, for example, in U.S. Pat. No. 3,929,485 (1975). In the preparation of the novel polycarbonate copolymers of the invention, these polymerizations are conducted including up to 50 mole percent of other dissimilar dihydroxy compounds together with the cyclohexylhydroquinone. It is also possible to prepare these copolycarbonates by polymerization of the bis(chlorocarbonate) of cyclohexylhydroquinone with cyclohexylhydroquinone, and by polymerization of cyclohexylhydroquinone with other carbonate precursors, such as carbonylbis(imidazole).

In general, the reactants in the polymerization are employed in a stoichiometric amount and the reaction is carried out under ambient condition of temperature and pressure, with cooling to control the exothermic reaction. Extended reaction times and/or a slight excess of one or more of the starting monomers may be required to obtain useful molecular weights because of the hindering effect of the pendant cyclohexyl group.

The dihydroxy compounds which may be used in the preparation of the polycarbonates of the present invention may, when required, be used in other forms, such as the bis-(chlorocarbonate). Suitable dihydroxy compounds which may be used to prepare the copolycarbonates of the invention include one or more other aliphatic, cycloaliphatic, or aromatic dihydroxy compounds containing 2-20 carbon atoms. Examples of such dihydroxy compounds are ethylene glycol, 1,6-hexanediol, 1,10-decanediol, 1,4-cyclohexanedimethanol, resorcinol, phenylhydroquinone, and 4,4'-isopropylidenediphenol. Generally, when dihydroxy compounds containing less than 6 carbons are used to prepare the copolycarbonates of the present invention, low temperature solution or interfacial preparation methods employing the dihydroxy compound as its bis(chlorocarbonate) or other suitable forms are preferred to avert undesirable side reactions, such as cyclic alkylene carbonate formation.

One of the preferred methods of producing a polycarbonate of the present invention is through the solution polymerization of cyclohexylhydroquinone with phosgene. This method can be carried out by placing cyclohexylhydroquinone, dry pyridine, and dry dichloromethane into a flask, and cooling the flask to keep the reaction temperature at 20°-30° C. For every 50 grams of cyclohexylhydroquinone used, about 40-60 mL of the pyridine, and about 250-300 mL of the dichloromethane should be added. While stirring and cooling the contents of the flask, phosgene gas can be added. The mixture can be allowed to stand overnight, and this can be followed by a slow addition of phosgene gas. Excess phosgene gas is sometimes required to obtain high molecular weight because of impurities in the phosgene. Because the solution viscosity of the polymerization mixture often increases appreciably, additional dichloromethane can be added to reduce the high viscosity. Excess pyridine can be neutralized by slowly adding to the stirred and cooled polymer solution HCl diluted with deionized water. After stirring for a final time, the polymerization mixture is allowed to separate into two layers, and the aqueous layer can be decanted away. The polymer solution can then be stirred and washed with deionized water to remove all traces of chloride ion, and the polycarbonate can then be precipitated in methanol, followed by a wash with methanol and vacuum drying. The resulting polycarbonate has an inherent viscosity at 25° C. of about 0.7, a glass transition temperature of from about 125°-130° C., and the product gives a transparent, tough film when pressed in a Hannafin press at a temperature of about 275° C.

Another preferred process for preparing the polycarbonate of cyclohexylhydroquinone of the present invention is a melt polymerization procedure with diphenyl carbonate. This procedure is carried out by placing into a flask cyclohexylhydroquinone and diphenyl carbonate, purging the flask with nitrogen, and heating the mixture in a metal bath at a temperature of about 250° C. The ratio of cyclohexylhydroquinone to diphenyl carbonate used should be about 1:1. It is preferred that stirring begin as soon as the monomers are sufficiently molten. Following the heating and stirring under nitrogen at 250°-320° C. for several hours, a vacuum is then applied, and the polymerization is continued under vacuum for several hours. By this process, a polycarbonate can be recovered which is light amber in color, has a glass transition temperature of about 145° C., and has an inherent viscosity of about 0.75. This polycarbonate also gives a clear tough film when pressed at 275° C.

The melt polymerization procedure using diphenyl carbonate described above can also be used to prepare a copolycarbonate of the present invention. To carry out this process, cyclohexylhydroquinone, diphenyl carbonate, and polymer grade bisphenol A are placed in a flask, and the flask is purged with nitrogen and immersed in a heated metal bath at a temperature of about 250° C. As soon as the monomers are sufficiently molten, the solution is stirred. After stirring under nitrogen at temperatures of up to about 320° C. for several hours, a vacuum is then applied, and the reaction is continued under vacuum at around 320° C. for up to about 10 hours. The copolycarbonate produced by this process is an amber, essentially transparent material which has an inherent viscosity of about 0.5 and a glass transition temperature of from about 130°-140° C. A film produced from this copolycarbonate product which was pressed at 275° C. is observed to be transparent and very tough.

The polycarbonates and copolycarbonates of the present invention may also be blended with other polymers and/or with pigments, fillers, or conventional reinforcing agents such as glass fibre or carbon fibre. The polymers of the invention may also contain other additives such as processing aids, flame retardants, or UV-stabilizers or antioxidants. Polymers with which the compounds of the present invention may be blended include polyamides such as nylon 6,6 from Dupont, poly(etherimides) such as Ultem from General Electric, polyphenylene oxides such as poly (2,6-dimethylphenylene oxide) or polyphenylene oxide/polystyrene blends such as Noryl from General Electric, polyesters, poly(ester-carbonates), polycarbonates such as Lexan from General Electric, polysulfones, polysulfone ethers, and poly(etherketones). Thus, using these additives and other agents, the products of the present invention can be used successfully in a great variety of applications.

Inherent viscosities (I.V.'s) of the polycarbonate and copolycarbonates are determined at 25° C. and 0.1 g/100 mL in a 40/25/35 mixture of o-chlorophenol/phenol/sym-tetrachloroethane. Glass transition temperatures (Tg's) are determined with a Perkin-Elmer DSC-2 differential scanning calorimeter. Typically, film of about 2-6 mils thickness are pressed in a Hannafin press at the temperatures specified. Hannafin presses have opposing, heated platens which are used to press the film.

The following examples are provided as illustrative of the present invention and are not intended to limit its scope in any way:

EXAMPLE 1

Preparation of the Polycarbonate of Cyclohexylhydroquinone Using Phosgene by the Solution Method A 1000-mL, three-necked flask is prepared with a glass stirrer with Teflon blade, a thermometer, an inlet for nitrogen gas, a glass tube through which phosgene gas is added, and a chilled water cooling bath to keep the reaction temperature at 20°-30° C. The phosgene addition tube extends well down into the flask so that the phosgene exits the tube below the surface of the polymerization mixture. Into the flask are then placed 48.00 g (0.25 mol) of cyclohexylhydroquinone, 60 mL (0.75 mol) of dry pyridine, and 275 mL of dry dichloromethane. To the stirred and cooled contents of the flask, phosgene gas is added below the surface until 24.2 g (0.24 mol) have been added. The mixture is allowed to stand overnight. The very slow addition of phosgene gas is resumed until 30.4 g (theoretically, 0.31 mol) have been added. The 'excess' phosgene is, presumably, required to obtain high molecular weight because of impurities in the phosgene. During this period, the solution viscosity of the polymerization mixture increases appreciably, and additional dichloromethane is added to reduce the viscosity. The excess pyridine is neutralized by slowly adding to the stirred and cooled polymer solution about 22 mL of 12N HCl diluted with 300 mL of deionized water. After being stirred for an additional 15-20 min, the polymerization mixture is allowed to separate into two layers, and the aqueous layer is decanted away. The polymer solution is then continuously stirred and washed with deionized water until a test for chloride ion in the effluent water is negative. (The water is introduced below the surface of the organic layer and allowed to overflow the flask.) The polycarbonate is then precipitated in methanol in a Waring blendor, washed with methanol, and vacuum dried at 100° C. The polycarbonate has an I.V. of 0.71, a Tg by DSC of 128° C. has good solubility in conventional solvents such as dichloromethane and gives a transparent, tough film when pressed at 275° C.

EXAMPLE 2

Preparation of the Polycarbonate of Cyclohexylhydroquinone by Melt Polymerization Via Diphenyl Carbonate Into a 100 mL, single-necked flask are placed 16.32 g (0.085 mol) of cyclohexylhydroquinone and 18.74 g (0.08755 mol) of diphenyl carbonate. After being purged three times with nitrogen, the flask is partially immersed in a heated metal bath at 250° C. Stirring is begun as soon as the monomers are sufficiently molten. The flask is heated with stirring under nitrogen as follows: 250° C./23 min, 260° C./55 min, 270° C./65 min, 280° C./55 min, 290° C./20 min, 300° C./20 min, and 320° C./15 min. Vacuum is then applied during 15 min to 0.5 torr, and the polymerization is continued under vacuum for a total of 5.9 hr. The polycarbonate is light amber, has a Tg of 145° C., has good solubility in dichloromethane, and has an I.V. of 0.75. A film pressed at 275° C. is clear and tough.

EXAMPLE 3

Preparation of a Copolycarbonate of Cyclohexylhydroquinone by Melt Polymerization Via Diphenyl Carbonate Into a 100-mL, single-necked flask are placed 9.69 g (0.0425 mol) of polymer grade bisphenol A, 8.16 g (0.0425 mol) of cyclohexylhydroquinone, and 18.74 g (0.0876 mol) of diphenyl carbonate. After being purged three times with nitrogen, the flask is partially immersed in a heated metal bath at 250° C. Stirring is begun as soon as the monomers are sufficiently molten. The flask is stirred under nitrogen as follows: 250° C./10 min, 260° C./1 hr, 270° C./1 hr, 280° C./65 min, 290° C./20 min, 300° C./20 min, and 320° C./25 min. Vacuum is then applied during 17 min to 0.5 torr, and the reaction is continued under vacuum at 320° C. for a total of 9.2 hr. The copolycarbonate product is an amber, essentially transparent material which has an I.V. of 0.49, a Tg of 136° C., and good solubility in dichloromethane. A film pressed at 275° C. is transparent and very tough.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

We claim:

1. A polycarbonate comprising the recurring units

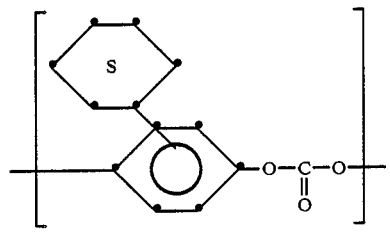

and having an inherent viscosity of at least about 0.3 as measured at 25° C. and 0.1 g/100 mL in a 40/25/35 w/w/w mixture of o-chlorophenol/phenol/sym-tetrachloroethane.

2. The polycarbonate of claim 1 consisting essentially of said recurring units.

* * * * *